UNITED STATES PATENT OFFICE.

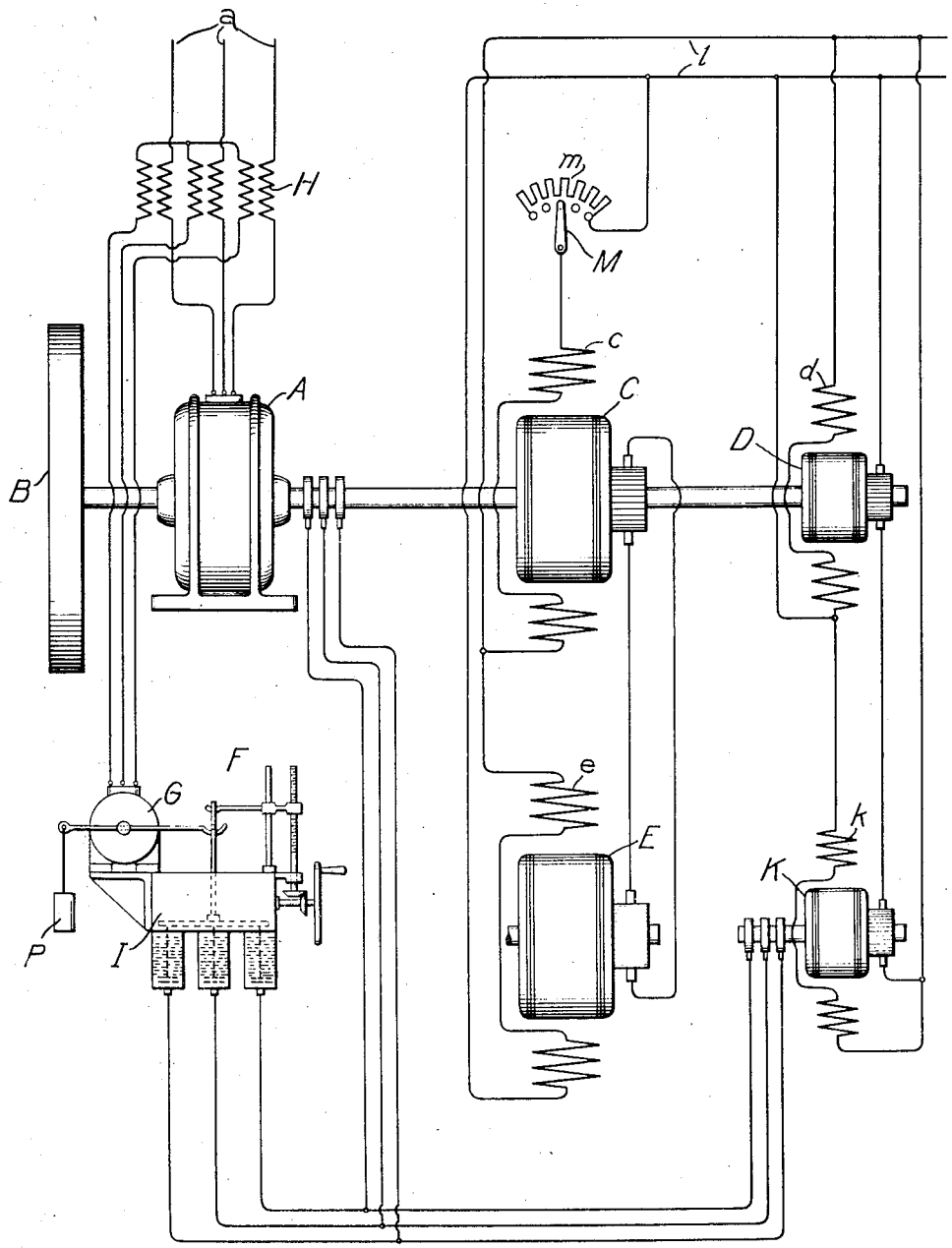

HERMANN NEHLSEN, OF BERLIN, GERMANY, ASSIGNOR TO GENERAL ELECTRIC COMPANY, A CORPORATION OF NEW YORK.

SYSTEM OF TRANSMISSION.

1,079,259.  Specification of Letters Patent.  Patented Nov. 18, 1913.

Application filed March 30, 1911. Serial No. 615,483.

*To all whom it may concern:*

Be it known that I, HERMANN NEHLSEN, a subject of the Emperor of Germany, residing at Berlin, Germany, have invented certain new and useful Improvements in Systems of Transmission, of which the following is a specification.

My invention relates to transmission systems and is particularly applicable to such a system in which an induction motor drives a source of direct current, and has for its object to obtain a direct current voltage independent of the speed of the source of direct current.

To this end, my invention consists in certain features of novelty which are pointed out with particularity in the claims annexed to and forming a part of this specification.

For a better understanding of my invention and the advantages possessed by it, reference may be had to the following description taken in connection with the accompanying drawing, in which the single figure represents diagrammatically a transmission system arranged in accordance with my invention.

In the drawing, my invention is shown in connection with a fly wheel motor generator set, in which an induction motor A, supplied from alternating current mains $a$, drives a fly wheel B, a direct current generator C having a separately excited field winding $c$, and also a source of direct current D, which is shown as a generator having a field winding $d$.

E represents a direct current motor supplied with current from the armature of the generator C, and $e$ represents the field winding of this motor. This motor E is mechanically connected to a load (not shown), which it drives.

F represents an automatic rheostat or slip regulator which is arranged to cut the resistance into and out of the rotor circuit of the induction motor A. This slip regulator consists of a slip regulating or "torque" motor G supplied with current from a series transformer H which is inserted in the alternating current mains $a$, and of a water rheostat I, the plates of which are separated or brought together by a slight action of the motor G. This "torque" motor does not rotate but simply exerts a torque and is similar in its action to a solenoid.

A rotary transforming apparatus K, which I have chosen to show as a rotary converter having a field winding $k$, is connected on its alternating current side to the rotor or secondary member of the induction motor and consequently in parallel with the rheostat of the slip regulator. The direct current side of the rotary converter is connected in series with the armature of the generator D across the bus bars or mains $l$.

M represents a control switch which is arranged to connect the generator field winding $c$ across the bus bars $l$ and to vary the current supplied to the generator field. The field windings $d$ of the generator D, the field winding $e$ of the motor E and the field winding $k$ of the rotary converter K are connected in parallel across the bus bars $l$.

In the drawing the switch M is shown in an operative position, in which part of the resistance $m$ is in circuit with the field winding $e$ of the generator C. By moving the switch, more or less of the resistance $m$ is placed in the field circuit.

The current taken from the alternating current mains by the motor A of the fly wheel motor generator set is prevented from exceeding a certain amount by means of the slip regulating device F. When the induction motor is lightly loaded the torque of the motor G and the weight P just balance the weight of the blades of the rheostat I. This rheostat is practically short circuited in this position. As the load is increased the current taken by motor A and the current transformed by the series transformer H is proportionately increased as is the torque of the motor G. As this torque increases the blades of the rheostat are separated in order to maintain the balance. This separation of the blades of the rheostat inserts resistance in the rotor circuit of the induction motor A and tends to slow it down, thereby permitting the fly wheel B to give up some of its stored energy. As the speed of the induction motor falls, the frequency and the voltage induced in the secondary of the motor increase. Since the direct current voltage of a rotary converter is proportional to the alternating current voltage, the direct current voltage of the rotary converter K rises because it is connected to the secondary of the induction motor. Since the exciter or generator D is driven by the induction motor A, its speed falls and consequently its voltage, with the decrease in speed of the induction motor. Since the armature of the converter K is in series with the armature of the generator D, the sum of the voltages of these machines remains constant; that is, the voltage supplied to the bus bars $l$ remains constant, regardless of the variations in speed of the fly wheel motor generator set.

The output of the rotary converter depends upon the variations in speed of the induction motor, but in any case it is small compared with that of generator D. By overexciting this rotary converter, it may be employed at the same time to compensate for lagging power factor of the induction motor.

I desire it to be understood that my invention is not limited to the specific arrangement of circuits shown and described, and I aim in the appended claims to cover all modifications which do not depart from the spirit and scope of my invention.

What I claim as new and desire to secure by Letters Patent of the United States, is,—

1. In combination, an induction motor, a source of alternating current supplying said motor, a separately excited generator coupled to a fly wheel driven by said motor, a second generator driven by said motor, automatic means for varying the speed of said induction motor so as to permit the fly wheel to return energy to said source, and a rotary transforming apparatus connected on its alternating current side to the secondary member of the induction motor, the direct current side of the transforming apparatus being connected in series with said second generator, said transforming apparatus and the second generator supplying the separate excitation for said first-mentioned generator.

2. In combination, an induction motor, a source of alternating current supplying said motor, a separately excited generator coupled to a fly wheel driven by said motor, automatic means for varying the speed of said induction motor so as to permit the fly wheel to return energy to said source, a direct current motor supplied by said generator, a second generator driven by said motor, and a rotary converter connected on its alternating current side to the secondary member of the induction motor, the direct current side of said rotary converter being connected in series with said second generator, said rotary converter and said second generator supplying separate excitation for said first-mentioned generator.

3. In combination, an induction motor, a direct current generator driven by said motor, a rheostat in the secondary circuit of said motor, a rotary transforming apparatus connected on its alternating current side in parallel with said rheostat and on its direct current side in series with said generator.

4. In combination, an induction motor, a rheostat in the secondary circuit of said motor, a direct current generator driven by said motor, direct current mains, and a rotary transforming apparatus connected on its alternating current side in parallel with said rheostat, the direct current side of said transforming apparatus being connected in series with said direct current generator across said mains.

5. In combination, an induction motor, a rheostat in the secondary circuit of said induction motor, a source of alternating current supplying said motor, direct current mains, a generator driven by said motor and supplying said mains, and means for automatically maintaining the potential of said mains independent of the speed of the induction motor comprising a rotary transforming apparatus connected on its alternating current side in parallel with said rheostat and on its direct current side in series with said generator across said direct current mains.

6. In combination, an induction motor, a source of alternating current supplying said motor, a separately excited generator, a fly wheel and a second generator driven by said motor, automatic means for varying the speed of said induction motor so as to permit the fly wheel to return energy to said source, direct current mains supplying excitation to said separately excited generator, and means for automatically maintaining the potential of said mains substantially constant independent of the speed of the induction motor comprising a rotary transformer apparatus, said rotary transformer apparatus being connected on its alternating current side to the secondary member of the induction motor and on its direct current side in series with the said second generator.

7. In combination, a source of alternating current, a fly-wheel motor generator set comprising a direct current generator, a fly-wheel and an induction motor, said motor being connected to said source, a rheostat for varying the speed of said induction motor so as to permit the fly-wheel to return energy to said source, and means connected to the secondary circuit of said motor for maintaining the field of said generator substantially constant independent of the speed of said induction motor.

8. In combination, an induction motor, a source of alternating current supplying said motor, a separately excited generator, a flywheel and a second generator driven by said motor, a rheostat for varying the speed of said induction motor so as to permit the flywheel to return energy to said source, direct current main supplying excitation to said separately excited generator, and means connected to the secondary circuit of said induction motor for automatically maintaining the potential of said mains substantially constant independent of the speed of said induction motor.

In witness whereof, I have hereunto set my hand this 24th day of February, 1911.

HERMANN NEHLSEN.

Witnesses:
CRISTIANO LARLI,
WILHELM WEILER.

---

It is hereby certified that in Letters Patent No. 1,079,259, granted November 18, 1913, upon the application of Hermann Nehlsen, of Berlin, Germany, for an improvement in "Systems of Transmission," an error appears in the printed specification requiring correction as follows: Page 3, line 4, for the word "main" read *mains;* and that the said Letters Patent should be read with this correction therein that the same may conform to the record of the case in the Patent Office.

Signed and sealed this 5th day of May, A. D., 1914.

[SEAL.]

J. T. NEWTON,

*Acting Commissioner of Patents.*